United States Patent
Kim et al.

(10) Patent No.: US 12,031,062 B2
(45) Date of Patent: *Jul. 9, 2024

(54) POLISHING SLURRY COMPOSITION FOR STI PROCESS

(71) Applicant: KCTECH CO., LTD., Gyeonggi-do (KR)

(72) Inventors: Jung Yoon Kim, Gyeonggi-do (KR); Jun Ha Hwang, Gyeonggi-do (KR); Kwang Soo Park, Gyeonggi-do (KR); Hae Won Yang, Seoul (KR)

(73) Assignee: KCTECH CO., LTD., Gyeonggi-do (KR)

( * ) Notice: Subject to any disclaimer, the term of this patent is extended or adjusted under 35 U.S.C. 154(b) by 466 days.

This patent is subject to a terminal disclaimer.

(21) Appl. No.: 17/415,703

(22) PCT Filed: Jul. 11, 2019

(86) PCT No.: PCT/KR2019/008531
§ 371 (c)(1),
(2) Date: Jun. 17, 2021

(87) PCT Pub. No.: WO2020/130256
PCT Pub. Date: Jun. 25, 2020

(65) Prior Publication Data
US 2022/0177727 A1    Jun. 9, 2022

(30) Foreign Application Priority Data

Dec. 20, 2018 (KR) .......................... 10-2018-0166060

(51) Int. Cl.
*C09G 1/02* (2006.01)

(52) U.S. Cl.
CPC ..................................... *C09G 1/02* (2013.01)

(58) Field of Classification Search
None
See application file for complete search history.

(56) References Cited

U.S. PATENT DOCUMENTS

| | | | |
|---|---|---|---|
| 6,824,579 B2 | 11/2004 | Ronay | |
| 9,238,753 B2* | 1/2016 | Reiss | C09K 3/1463 |
| 11,332,641 B2* | 5/2022 | Shin | C09K 3/1463 |
| 11,384,255 B2* | 7/2022 | Yang | C09K 3/14 |
| 2013/0171824 A1 | 7/2013 | Li et al. | |
| 2015/0024596 A1* | 1/2015 | Minami | H01L 21/76224 438/693 |
| 2017/0081554 A1* | 3/2017 | Tsuchiya | C09K 3/1463 |
| 2018/0002571 A1* | 1/2018 | Stender | H01L 21/3212 |
| 2018/0118977 A1* | 5/2018 | Urban | C09G 1/02 |
| 2019/0106596 A1* | 4/2019 | Mishra | H01L 21/31053 |

FOREIGN PATENT DOCUMENTS

| | | |
|---|---|---|
| CN | 1746255 | 3/2006 |
| CN | 111492024 | 8/2020 |
| CN | 111511856 | 8/2020 |
| KR | 20080067665 | 7/2008 |
| KR | 20100011030 | 2/2010 |
| KR | 20100021941 | 2/2010 |
| KR | 20130077699 | 7/2013 |
| KR | 20140133604 | 11/2014 |

OTHER PUBLICATIONS

"International Search Report (Form PCT/ISA/210) of PCT/KR2019/008531", mailed on Oct. 11, 2019, with English translation thereof, pp. 1-6.

* cited by examiner

*Primary Examiner* — Shamim Ahmed
(74) *Attorney, Agent, or Firm* — JCIPRNET

(57) ABSTRACT

The present disclosure relates to a polishing slurry composition for an STI process and, more specifically, to a polishing slurry composition for an STI process, the polishing slurry composition comprising: a polishing solution including polishing particles; and an additive solution containing a polymer having an amide bond, and a polysilicon film polishing barrier inclusive of a monomer having three or more chains linked to one or more atoms.

11 Claims, No Drawings

POLISHING SLURRY COMPOSITION FOR STI PROCESS

TECHNICAL FIELD

The present disclosure relates to a polishing slurry composition for a shallow trench isolation (STI) process which may have a high polishing rate and may inhibit a dishing phenomenon.

BACKGROUND ART

As semiconductor devices become more diversified and highly integrated, finer pattern formation techniques are being used, and accordingly a surface structure of semiconductor devices becomes more complicated and a step height of surface films also becomes greater. A chemical mechanical polishing (CMP) process is used as a planarization technique for removing a stepped portion of a specific film formed on a wafer in manufacturing of a semiconductor device. The CMP process is, for example, a process for removing an insulating film excessively formed for layer insulation, and is widely used as a process for planarizing an interlayer dielectric (ILD) and an insulating film for shallow trench isolation (STI) to insulate chips from each other and as a process for forming a metal conductive film, for example, a wiring, a contact plug, a via contact, and the like.

An STI process introduces technology of cutting an isolation portion, forming a trench, depositing an oxide and then performing planarization through CMP. Here, a selective polishing characteristic of increasing a polishing rate of an oxide layer that is an insulating film and reducing a polishing rate of a nitride layer that is a diffusion barrier is required.

In particular, even though excessive polishing is performed in a cell-type pattern, a loss on a polysilicon film that is a pattern film needs to be reduced. As a slurry composition applied to currently commercialized STI processes, a slurry additive composition having a negative zeta potential is being applied, and a slurry dispersed with a negative charge and an anionic polymer additive are being used for the slurry additive composition. However, the slurry additive composition having the negative zeta potential has issues of high probabilities of occurrence of defects or scratches after a cell-type pattern is polished, and a high level of dishing of an insulating film during excessive polishing.

DISCLOSURE OF INVENTION

Technical Goals

To solve the above-described problems, an aspect of the present disclosure is to provide a polishing slurry composition for a shallow trench isolation (STI) process that may have a high polishing speed and a high polishing selectivity with respect to a target film to be polished, may reduce a loss of a polishing stop film by enhancing a polishing stop function and a protection function when the polishing stop film is exposed, and may inhibit dishing and defects from occurring after a polishing process of a pattern wafer.

However, aspects of the present disclosure are not limited to the one set forth herein, and other aspects not mentioned herein would be clearly understood by one of ordinary skill in the art from the following description.

Technical Solutions

According to an aspect of the present disclosure, there is provided a polishing slurry composition for a shallow trench isolation (STI) process including: a polishing solution including abrasive particles; and an additive solution, wherein the additive solution includes a polysilicon film polishing inhibitor including a polymer having an amide bond and a monomer having three or more chains linked to one or more atoms.

According to an example embodiment of the present disclosure, the polymer having the amide bond may include at least one of polymers represented by Chemical Formula 1 shown below.

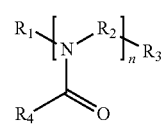

[Chemical Formula 1]

(In Chemical Formula 1, $R_1$, $R_3$ and $R_4$ are each selected from hydrogen, a hydroxy group, a $C_{1-30}$ alkyl group, a $C_{2-30}$ alkenyl group, a $C_{2-30}$ alkynyl group, a $C_{1-30}$ alkoxy group, a $C_{6-30}$ aryl group, a $C_{5-30}$ heteroaryl group (containing one or more heteroatoms selected from the group consisting of N, O and S), a $C_{4-30}$ heterocyclic group (containing one or more heteroatoms selected from the group consisting of N, O and S), a $C_{7-30}$ aralkyl group, an amine group, a —NH($R_4$)—$R_5$ (in which $R_4$ is $C_{1-30}$ alkylene or $C_{2-30}$ alkenylene, and $R_5$ is hydrogen or a hydroxy group), an oxyamine group, an azide group, and a thiol group, $R_2$ is a simple bond and substituted or unsubstituted $C_{1-30}$ alkylene, $C_{2-30}$ alkenylene, $C_{7-30}$ cycloalkylene, $C_{6-30}$ arylene, $C_{7-30}$ arylalkylene, or $C_{2-30}$ alkynylene, and n is an integer greater than or equal to "1".)

According to an example embodiment of the present disclosure, the polymer may include at least one selected from the group consisting of poly(2-methyl-2-oxazoline), poly(2-methyl-2-oxazoline) having a hydroxyl end, poly(2-methyl-2-oxazoline) having α-benzyl and ω-azide end, poly (2-methyl-2-oxazoline) having an azide end, poly(2-methyl-2-oxazoline) having a piperazine end, poly(2-ethyl-2-oxazoline), poly(2-ethyl-2-oxazoline) having an alkyne end, poly(2-ethyl-2-oxazoline) having α-benzyl and ω-thiol end, poly(2-ethyl-2-oxazoline) having α-methyl and ω-2-hydroxyethyl amine end, poly(2-ethyl-2-oxazoline) having an amine end, poly(2-ethyl-2-oxazoline) having a piperazine end, poly(2-propyl-2-oxazoline), poly(2-propyl-2-oxazoline) having an azide end, and derivatives thereof.

According to an example embodiment of the present disclosure, the polymer may have a weight-average molecular weight of 1,000 to 5,000,000.

According to an example embodiment of the present disclosure, the polymer may be present in an amount of 0.001% by weight (wt %) to 1 wt % in the additive solution.

According to an example embodiment of the present disclosure, the monomer may form a cross-linking bond with the polymer, The monomer may include at least one selected from the group consisting of tetraethylenepentamine (TEPA), pentaethylenehexamine (PEHA), hexaethyleneheptamine (HEHA), heptaethyleneoctamine (HEOA), triethylenetetramine, hydroxyethyltriethylenetetramine (HETETA), hydroxyethyltetraethylenepentamine (HETEPA), tripropylenetetraamine, N-(3-aminopropyl)ethylenediamine (Am3), N,N'-bis(3-aminopropyl)ethylenediamine (Am4); N,N,N'-tris(3-aminopropyl)ethylenediamine (Am5), N-(3-aminopropyl)-1,3-diaminopropane (N-(3-aminopropyl)-1,3-propanediamine), N,N'-bis(3-aminopropyl)-1,3-diaminopropane, N,N,N'-tris(3-aminopropyl)-1,3-diaminopropane, diethylenetriamine (DETA), bis(3-aminopropyl)amine, bis(hexamethylene)triamine, dipropylenetriamine, 4-(2-aminoethyl)-N-(2-aminoethyl)-N'-{2-{(2-aminoethyl)amino}ethyl}-1,2-ethanediamine, aminoethylpiperazine, 1-(2-aminoethyl)-4-[(2-aminoethyl)amino]ethyl]-piperazine, and (1-[2-[[2-[(2-aminoethyl)amino]ethyl]amino]ethyl]-piperazine).

According to an example embodiment of the present disclosure, a molar ratio of the polymer:the monomer may be 1:0.01 to 2.

According to an example embodiment of the present disclosure, the polymer and the monomer may be included in the form of polymer cross-linking compounds.

According to an example embodiment of the present disclosure, the abrasive particles may be prepared using a solid-phase method or a liquid-phase method, and surfaces of the abrasive particles may have positive charges.

According to an example embodiment of the present disclosure, the abrasive particles may include at least one selected from the group consisting of a metal oxide, a metal oxide coated with an organic material or inorganic material, and the metal oxide in a colloidal phase. The metal oxide may include at least one selected from the group consisting of silica, ceria, zirconia, alumina, titania, barium titania, germania, mangania, and magnesia.

According to an example embodiment of the present disclosure, the abrasive particles may include a primary particle with a size of 5 nanometers (nm) to 150 nm and a secondary particle with a size of 30 nm to 300 nm. The abrasive particles may be present in an amount of 0.1 wt % to 10 wt % in the polishing slurry composition for the STI process.

According to an example embodiment of the present disclosure, the polishing slurry composition may further include water; and a volume ratio of the polishing solution:the water:the additive solution may be 1:3 to 10:1 to 10.

According to an example embodiment of the present disclosure, the additive solution may further include an amphoteric compound, and the amphoteric compound may include at least one selected from the group consisting of lysine, methionine, cysteine, tyrosine, glycine, alanine, serine, phenylalanine, threonine, valine, leucine, isoleucine, proline, histidine, lysine, arginine, aspartic acid, tryptophan, glutamine, betaine, cocomidopropylbetaine, lauryl betaine, stearyl betaine, lauryl propyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium betaine, 2-alkyl-N-carboxymethyl-N-hydroxyethylimidazolium betaine, lauryldimethylamine oxide, and lecithin.

According to an example embodiment of the present disclosure, the amphoteric compound may be included in an amount of 0.001 wt % to 2 wt % in the additive solution.

According to an example embodiment of the present disclosure, the additive solution may further include at least one acidic material selected from the group consisting of carboxylic acid, nitric acid, hydrochloric acid, phosphoric acid, sulfuric acid, hydrofluoric acid, bromic acid, iodic acid, pimelic acid, malic acid, malonic acid, maleic acid, acetic acid, adipic acid, oxalic acid, succinic acid, tartaric acid, citric acid, lactic acid, glutaric acid, glycolic acid, formic acid, fumaric acid, propionic acid, butyric acid, hydroxybutyric acid, aspartic acid, itaconic acid, tricarballyic acid, suberic acid, benzoic acid, phenylacetic acid, naphthoic acid, mandelic acid, picolinic acid, nicotinic acid, isonicotinic acid, quinolinic acid, anthranilic acid, fumaric acid, phthalic acid, isophthalic acid, terephthalic acid, pyridinecarboxylic acid, salicylic acid, glutamic acid, polyacrylic acid, a polyacrylic acid copolymer, polysulfonic acid, poly-α-methylstyrene sulfonic acid, poly-ρ-methylstyrene sulfonic acid, polystyrene sulfonic acid, polyvinyl sulfonic acid, a polysulfonic acid copolymer, a polysulfonic acid/acrylamide copolymer, and polyacrylamide methylpropane sulfonic acid.

According to an example embodiment of the present disclosure, pH of the polishing slurry composition for the STI process may range from 3 to 7. The polishing slurry composition for the STI process may have a zeta potential of +5 millivolts (mV) to +70 mV.

According to an example embodiment of the present disclosure, a polishing selectivity of an insulating film:a polysilicon film may range from 10:1 to 1000:1.

Effects

Example embodiments of the present disclosure may provide a slurry composition that may have a high polishing speed for a target film to be polished (for example, an insulating film layer) and an excellent polishing inhibition function for a polishing stop film (for example, a polysilicon layer), to have a high selectivity and an automatic polishing stop function.

A slurry composition of the present disclosure may protect a pattern polysilicon layer in a cell-type pattern wafer to reduce a loss of a polysilicon layer by inhibiting occurrence of defects, scratches, and the like after the pattern wafer is excessively polished.

A slurry composition of the present disclosure may prevent an insulating film layer between patterns from being excessively polished when a pattern polysilicon layer is exposed in a pattern wafer, to inhibit dishing from occurring on an insulating film. Also, the slurry composition may exhibit an excellent effect of enhancing a planarization degree after polishing by maintaining a relatively high insulating film removal speed.

A slurry composition of the present disclosure may be applied to a shallow trench isolation (STI) process of a semiconductor device, to enable manufacturing of a semiconductor device with a more excellent reliability and characteristic.

BEST MODE FOR CARRYING OUT THE INVENTION

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

Throughout the specification, when one component is positioned "on" another component, this not only includes a case that the component is brought into contact with the other component, but also includes a case that another component exists between two components.

It will be understood throughout the whole specification that, when one part "includes" or "comprises" one component, the part does not exclude other components but may further include the other components.

Hereinafter, a polishing slurry composition for a shallow trench isolation (STI) process will be described in detail with reference to example embodiments and drawings. However, the present disclosure is not limited to the example embodiments and drawings.

According to an example embodiment of the present disclosure, a polishing slurry composition for an STI process may include a polishing solution including abrasive particles; and an additive solution, and may exhibit a high polishing rate for a target film to be polished, together with a high selectivity and an automatic polishing stop function by a protection function of a film and polishing inhibition when a polishing stop film is exposed.

The abrasive particles may be present in an amount of 0.1% by weight (wt %) to 10 wt % in the polishing slurry composition for the STI process. When the amount of the abrasive particles is less than 0.1 wt %, a polishing speed may decrease. When the amount of the abrasive particles exceeds 10 wt %, a polishing speed may significantly increase, and surface defects may be caused by adsorbability of particles remaining on a surface due to an increase in a number of abrasive particles.

The abrasive particles may be prepared by a solid-phase method or a liquid-phase method, and may be dispersed so that surfaces of the abrasive particles may have positive charges. The liquid-phase method may include, for example, a sol-gel method of causing a chemical reaction of abrasive particle precursors in an aqueous solution and of growing crystals to obtain fine particles, or a coprecipitation method of precipitating abrasive particle ions in an aqueous solution, and a hydrothermal synthesis of forming abrasive particles at a high temperature under a high pressure. Also, the solid-phase method may include a method of calcinating abrasive particle precursors at a temperature of 400° C. to 1,000° C.

The abrasive particles may include at least one selected from the group consisting of a metal oxide, a metal oxide coated with an organic material or inorganic material, and the metal oxide in a colloidal phase. The metal oxide may include at least one selected from the group consisting of silica, ceria, zirconia, alumina, titania, barium titania, germania, mangania, and magnesia.

The abrasive particles may be dispersed to have positive charges, and may be, for example, ceria dispersed to have positive charges. The ceria dispersed to have positive charges may be mixed with an additive solution activated as positive charges, thereby realizing higher stepped portion removal performance, an excellent polishing speed, and an automatic polishing stop function.

The abrasive particles may include a primary particle with a size of 5 nanometers (nm) to 150 nm and a secondary particle with a size of 30 nm to 300 nm. An average particle size of the abrasive particles may be measured as an average value of particle sizes of a plurality of particles within a field of view which may be measured by a scanning electron microscope analysis or dynamic light scattering. The size of the primary particle may need to be less than or equal to 150 nm to ensure a particle uniformity. When the size of the primary particle is less than 5 nm, a polishing rate may decrease. In the size of the secondary particle in the polishing slurry composition for the STI process, when the size of the secondary particle is less than 30 nm, and when small particles are excessively generated due to milling, cleanability may decrease, and an excess of defects may occur on a wafer surface. When the size of the secondary particle exceeds 300 nm, it may be difficult to adjust a selectivity due to excessive polishing, and surface defects such as dishing, erosion, defects, scratches, and the like may be likely to occur.

The abrasive particles may be mixed particles with a multi-dispersion type particle distribution, in addition to a single-size particle. For example, abrasive particles with two different types of average particle sizes may be mixed to have a bimodal particle distribution, or abrasive particles with three different types of average particle sizes may be mixed to have a particle size distribution showing three peaks. Also, abrasive particles with at least four different types of average particle sizes may be mixed to have a multi-dispersion type particle distribution. Relatively large abrasive particles and relatively small abrasive particles may be mixed, thereby obtaining more excellent dispersibility and expecting an effect of reducing defects and scratches on a wafer surface.

According to an example embodiment of the present disclosure, the additive solution may provide an excellent polishing rate of a target film to be polished, may enhance a polishing speed inhibition and protection function of a polishing stop film when the polishing stop fil is exposed, and in particular, may inhibit an occurrence of dishing by preventing excessive polishing while providing excellent polishing performance for an insulating film layer after a pattern wafer is polished.

The additive solution may include a polymer having an amide bond, and a monomer.

The polymer having the amide bond may be present in an amount of 0.001 wt % to 1 wt % in the additive solution. When the amount of the polymer is less than 0.001 wt %, it may be difficult to implement an automatic polishing stop function for a polysilicon film. When the amount of the polymer exceeds 1 wt %, residuals may remain due to polishing that is insufficiently performed by a polymer network. In other words, an insulating film layer may be insufficiently polished during polishing of a pattern wafer, so that the insulating film layer may remain on a pattern.

The polymer having the amide bond may include at least one of compounds represented by Chemical Formula 1 shown below.

[Chemical Formula 1]

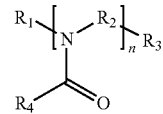

In Chemical Formula 1, $R_1$, $R_3$ and $R_4$ are each selected from hydrogen, a hydroxy group, a $C_{1-30}$ alkyl group, a $C_{2-30}$ alkenyl group, a $C_{2-30}$ alkynyl group, a $C_{1-30}$ alkoxy group, a $C_{6-30}$ aryl group, a $C_{5-30}$ heteroaryl group (containing one or more heteroatoms selected from the group consisting of N, O and S), a $C_{4-30}$ heterocyclic group (containing one or more heteroatoms selected from the group consisting of N, O and S), a $C_{7-30}$ aralkyl group, an amine group, a —NH($R_4$)—$R_5$ (in which $R_4$ is $C_{1-30}$ alkylene or $C_{2-30}$ alkenylene, and $R_5$ is hydrogen or a hydroxy group), an oxyamine group, an azide group, and a thiol group, $R_2$ is a simple bond and substituted or unsubstituted $C_{1-30}$ alkylene, $C_{2-30}$ alkenylene, $C_{7-30}$ cycloalkylene, $C_{6-30}$ arylene, $C_{7-30}$ arylalkylene, or $C_{2-30}$ alkynylene, and n is an integer greater than or equal to "1", and may be, for example, an integer of "1" to "100".

For example, the polymer may include at least one selected from the group consisting of poly(2-methyl-2-oxazoline), poly(2-methyl-2-oxazoline) having a hydroxyl end, poly(2-methyl-2-oxazoline) having α-benzyl and ω-azide end, poly(2-methyl-2-oxazoline) having an azide end, poly(2-methyl-2-oxazoline) having a piperazine end, poly(2-ethyl-2-oxazoline), poly(2-ethyl-2-oxazoline) having an alkyne end, poly(2-ethyl-2-oxazoline) having α-benzyl and ω-thiol end, poly(2-ethyl-2-oxazoline) having α-methyl and ω-2-hydroxyethylamine end, poly(2-ethyl-2-oxazoline) having an amine end, poly(2-ethyl-2-oxazoline) having a piperazine end, poly(2-propyl-2-oxazoline), poly(2-propyl-2-oxazoline) having an azide end, and derivatives thereof.

The polymer may have a molecular weight (weight-average molecular weight) of 1,000 to 5,000,000; 1,000 to 1,000,000; or 1,000 to 500,000.

The monomer may form a cross-linking bond with the polymer and may be electrostatically adsorbed to a polishing stop film, to protect the polishing stop film and provide a polishing inhibition function.

In other words, the polymer and the monomer may function as polishing inhibitors of a polysilicon film. For example, when a polysilicon pattern is exposed, a cross-linked product of the monomer and the polymer may be adsorbed to a film, to provide a high selectivity by adjusting a polishing speed of the polysilicon film, and to prevent excessive polishing and reduce the level of dishing of an insulating film by protecting the polysilicon film and the insulating film.

The monomer may be an amine compound having three or more chains linked to one or more atoms. The monomer may include, for example, at least one selected from the group consisting of tetraethylenepentamine (TEPA), pentaethylenehexamine (PEHA), hexaethyleneheptamine (HEHA), heptaethyleneoctamine (HEOA), triethylenetetramine, hydroxyethyltriethylenetetramine (HETETA), hydroxyethyltetraethylenepentamine (HETEPA), tripropylenetetraamine, N-(3-aminopropyl)ethylenediamine (Am3), N,N'-bis(3-aminopropyl)ethylenediamine (Am4); N,N,N'-tris(3-aminopropyl)ethylenediamine (Am5), N-(3-aminopropyl)-1,3-diaminopropane (N-(3-aminopropyl)-1,3-propanediamine), N,N'-bis(3-aminopropyl)-1,3-diaminopropane, N,N,N'-tris(3-aminopropyl)-1,3-diaminopropane, diethylenetriamine (DETA), bis(3-aminopropyl)amine, bis(hexamethylene)triamine, dipropylenetriamine, 4-(2-aminoethyl)-N-(2-aminoethyl)-N'-{2-{(2-aminoethyl)amino}ethyl}-1,2-ethanediamine, aminoethylpiperazine, 1-(2-aminoethyl)-4-[(2-aminoethyl)amino]ethyl]-piperazine, and (1-[2-[[2-[(2-aminoethyl)amino]ethyl]amino]ethyl]-piperazine).

The monomer may be present in an amount of 0.001 wt % to 1 wt % in the additive solution. When the amount of the monomer is less than 0.001 wt %, an amount of dishing occurring between pattern polysilicon films during excessive polishing of a pattern wafer may increase due to a weak protection function of a polishing stop film. When the amount of the monomer exceeds 1 wt %, a selectivity may decrease, or defects and scratches on an insulating film may occur.

The polymer and the monomer may be included in the form of polymer cross-linking compounds by forming a cross-linking bond, instead of being simply mixed.

The polymer and the monomer may be included at a molar ratio of 1:0.01 to 2. When the polymer and the monomer are included within the molar ratio, the polymer and the monomer may form a sufficient cross-linking bond, may implement a high polishing selectivity by a polishing speed adjustment and film protection function, and may inhibit dishing, defects and scratches from occurring on an insulating film after polishing.

The additive solution may further include an amphoteric compound. The amphoteric compound may be used to control a selectivity and a dispersion stability of a slurry, and the amphoteric compound may refer to a compound that acts as a base for an acidic material and an acid for a basic material. In the present disclosure, the amphoteric compound may include an amino acid having bipolar charges. The amino acid may have both a carboxyl group (—COOH) indicating an acidity and an amino group (—NH$_2$) indicating a basicity in a single molecule. The amino acid may act as an acid or a base depending on pH if dissolved in water, and accordingly the amino acid may be referred to as an amphoteric compound. Depending on pH of a solution, both a (base) cation (—NH$_2$+H$^+$>>>—NH$_3^+$) that accepts hydrogen ions (H$^+$) in a molecular structure and an (acid) anion (—COOH>>>—COO$^-$+H$^+$) that releases hydrogen ions (H$^+$) may be contained, and accordingly an amphoteric ion may be formed.

For example, the amphoteric compound may include at least one selected from the group consisting of lysine, methionine, cysteine, tyrosine, glycine, alanine, serine, phenylalanine, threonine, valine, leucine, isoleucine, proline, histidine, lysine, arginine, aspartic acid, tryptophan, glutamine, betaine, cocomidopropylbetaine, lauryl betaine, stearyl betaine, lauryl propyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium betaine, 2-alkyl-N-carboxymethyl-N-hydroxyethylimidazolium betaine, lauryldimethylamine oxide, and lecithin.

The amphoteric compound may be present in an amount of 0.001 to 1 wt % in the additive solution. When the amount of the amphoteric compound is within the above range, an effect of controlling a selectivity and enhancing polishing performance may be obtained.

The additive solution may further include an acidic material. The acidic material may include at least one selected from the group consisting of carboxylic acid, nitric acid, hydrochloric acid, phosphoric acid, sulfuric acid, hydrofluoric acid, bromic acid, iodic acid, pimelic acid, malic acid, malonic acid, maleic acid, acetic acid, adipic acid, oxalic acid, succinic acid, tartaric acid, citric acid, lactic acid, glutaric acid, glycolic acid, formic acid, fumaric acid, propionic acid, butyric acid, hydroxybutyric acid, aspartic acid, itaconic acid, tricarballyic acid, suberic acid, benzoic acid, phenylacetic acid, naphthoic acid, mandelic acid, picolinic acid, nicotinic acid, isonicotinic acid, quinolinic acid, anthranilic acid, fumaric acid, phthalic acid, isophthalic acid, terephthalic acid, pyridinecarboxylic acid, salicylic acid, glutamic acid, polyacrylic acid, a polyacrylic acid copolymer, polysulfonic acid, poly-α-methylstyrene sulfonic acid, poly-ρ-methylstyrene sulfonic acid, polystyrene sulfonic acid, polyvinyl sulfonic acid, a polysulfonic acid copolymer, a polysulfonic acid/acrylamide copolymer, and polyacrylamide methylpropane sulfonic acid.

For example, the polyacrylic acid copolymer may be a polyacrylic acid-sulfonic acid copolymer, a polyacrylic acid/styrene copolymer, a polyacrylic acid-malonic acid copolymer, a polyacrylic acid-polystyrene copolymer, and the like.

The acidic material may be present in an amount of 0.001 wt % to 1 wt % in the additive solution. When the amount of the acidic material in the polishing slurry composition for the STI process is less than 0.001 wt % or exceeds 1 wt %, a stability of a slurry composition may not be secured, and accordingly desired performance may not be achieved or defects may occur.

The additive solution may further include a basic material. The basic material may have pKa of 9 or more. The basic material may include, for example, at least one selected from the group consisting of tetramethylammonium hydroxide, ammonia, potassium hydroxide, sodium hydroxide, magnesium hydroxide, rubidium hydroxide, cesium hydroxide, sodium hydrogen carbonate, sodium carbonate, methylamine, ethanolamine, propylamine, butylamine, isopropylamine, monoethanolamine, diethanolamine, triethanolamine, dipropylamine, ethylenediamine, propanediamine, triethylamine, tributylamine, tetramethylamine, triethylenetetramine, tetraethylenepentamine, N-methyldiethanolamine, N-propyldiethanolamine, N-isopropyldiethanolamine, N-(2-methylpropyl)diethanolamine, N-n-butyldiethanolamine, N-t-butylethanolamine, N-cyclohexyldiethanolamine, N,N-bis (2-hydroxypropyl) ethanolamine, triisopropanolamine, 2-amino-2-ethyl-1,3-propanediol, 2-dimethylamino-2-methyl-1-propanol, 1-dimethylamino-2-propanol, 3-dimethylamino-1-propanol, 2-dimethylamino-1-propanol, 2-diethylamino-1-propanol, 2-diethylamino-1-ethanol, 2-ethylamino-1-ethanol, 1-(dimethylamino)2-propanol, 3-amino-1-propanol, 2-amino-1-propanol, 1-amino-2-propanol, 1-amino-phentanol, 2-(dimethylamino)ethanol, 2-diethylaminoethanol, 2-dipropylaminoethanol, 2-butylaminoethanol, 2-t-butylaminoethanol, 2-cycloaminoethanol, 2-amino-2-phentanol, 2-[bis(2-hydroxyethyl)amino]-2-methyl-1-propanol, 2-[bis (2-hydroxyethyl)amino]-2-propanol, 2-amino-2-methyl-1-propanol, and tris(hydroxymethyl)aminomethane.

The basic material may be present in an amount of 0.01 wt % to 1 wt % in the additive solution. When the amount of the basic material is less than 0.01 wt % or exceeds 1 wt %, a stability of a slurry composition may not be secured, and accordingly desired performance may not be achieved or defects may occur.

pH of the polishing slurry composition for the STI process may range from 3 to 7. When the pH is out of the above range, a dispersion stability may rapidly decrease and aggregation may occur.

A process of preparing the polishing slurry composition for the STI process may include a concentration process and a dilution process. For example, the polishing slurry composition for the STI process may further include water; and a ratio of the polishing solution:the water:the additive solution may be 1:3 to 10:1 to 10. The water may include, for example, deionized water, ion-exchanged water and ultra-pure water. In an example in which a proportion of the additive solution is in a range of 1 to 4, when the proportion of the additive solution decreases, the polishing slurry composition may be suitable for use in polishing of a bulk high-stepped portion. When the proportion of the additive solution increases within a range of 5 to 10, a polishing stop function of a polysilicon film may be enhanced, thereby effectively separating devices in the STI process.

According to an example embodiment of the present disclosure, the polishing slurry composition may be provided in a two-liquid form in which a polishing solution and an additive solution are prepared separately and mixed immediately before polishing, and also be provided in a one-liquid form in which a polishing solution and an additive solution are mixed.

According to an example embodiment of the present disclosure, the polishing slurry composition for the STI process may be a positive slurry composition that exhibits positive charges, and may have a zeta potential of +5 millivolts (mV) to +70 mV. Due to positively charged abrasive particles, a high dispersion stability may be maintained so that the abrasive particles may not aggregate, thereby reducing an occurrence of micro-scratches.

According to an example embodiment of the present disclosure, in the polishing slurry composition for the STI process, a polishing selectivity of an insulating film:a polysilicon film may range from 10:1 to 1000:1. The insulating film may have a polishing rate of 1,000 angstroms ( ) to 10,000, and the polysilicon film may have a polishing rate of 30/min or less. More desirably, the polishing rate of the polysilicon film may be 10/min or less.

For example, in a blanket wafer, a polishing selectivity of an insulating film:a polysilicon film may range from 10:1 to 1000:1. In a pattern wafer, a polishing selectivity of an insulating film:a polysilicon film may range from 10:1 to 1000:1.

The polishing slurry composition for the STI process according to the present disclosure may include a polymer having an amide bond and a monomer that forms a cross-linking bond, to have an automatic polishing stop function for a polysilicon film by inhibiting polishing on a surface of the polysilicon film, and to reduce a loss of the polysilicon film and an occurrence of dishing on an insulating film during excessive polishing. In other words, by the polishing slurry composition for the STI process according to the present disclosure, a high polishing rate for an insulating film layer and inhibition of polishing of a polysilicon pattern layer may be possible, thereby protecting a polysilicon layer. Also, an amount of dishing of an insulating film during polishing of a pattern wafer may be reduced. Thus, by applying the polishing slurry composition to an STI process of a semiconductor device, it is possible to enable manufacturing of a semiconductor device with more excellent reliability and characteristics.

Hereinafter, the present disclosure will be described in detail with reference to examples. However, the following examples are merely illustrative of the present disclosure, and the present disclosure is not limited to the examples.

Examples 1 to 7

An additive solution was prepared, and a polishing solution including ceria abrasive particles with a particle size of 150 nm was prepared, as shown in Table 1 below. In other words, a polishing slurry composition for an STI process was prepared at a ratio of the polishing solution:water:the additive solution of 1:6:3.

[Polishing Conditions]
1. Polishing machine: AP-300 (300 mm, manufactured by KCTECH)
2. Pad: IC 1000 (manufactured by DOW)
3. Polishing time: 60 sec
4. Platen RPM: 93 rpm
5. Spindle RPM: 87 rpm
6. Pressure: 3 psi
7. Flow rate: 250 ml/min
8. Used wafers:
   Wafer: PE-TEOS 20 K ( ), P-Poly 2K ( )

Pattern wafer: STI poly pattern wafer 5000 K ( ), Trench depth 5 K ( )

Table 1 shows a removal rate (RR) of each of a polysilicon film and an oxide film (TEOS) when an STI polysilicon pattern wafer was polished using polishing slurry compositions for the STI process and slurry compositions of examples and comparative examples.

TABLE 1

| Classification | Compositions | | | | 300 mm CMP | |
| --- | --- | --- | --- | --- | --- | --- |
| | Polymer* | Monomer | Polymer/Monomer (Molar ratio) | pH | TEOS (/min) | P-Poly (/min) |
| Example 1 | 0.02 mol/L | PEHA 0.02 mol/L | 1 | 5.0 | 2252 | 5.0 |
| Example 2 | 0.02 mol/L | PEHA 0.02 mol/L | 1 | 4.5 | 2071 | 5.0 |
| Example 3 | 0.01 mol/L | TEPA 0.15 mol/L | 0.1 | 4.5 | 1930 | 6.7 |
| Example 4 | 0.01 mol/L | PEHA 0.03 mol/L | 0.3 | 5.0 | 2100 | 5.0 |
| Example 5 | 0.001 mol/L | PEHA 0.03 mol/L | 0.03 | 5.5 | 2400 | 5.0 |
| Example 6 | 0.016 mol/L | PEHA 0.03 mol/L | 0.53 | 5.5 | 2300 | 5.0 |
| Example 7 | 0.032 mol/L | PEHA 0.03 mol/L | 1.07 | 5.5 | 2000 | 5.0 |
| Example 8 | 0.032 mol/L | TETA 0.03 mol/L | 1.07 | 5.5 | 3120 | 6.7 |
| Example 9 | 0.032 mol/L | AEP 0.03 mol/L | 1.07 | 5.5 | 2930 | 6.0 |
| Example 10 | 0.032 mol/L | AETETA 0.03 mol/L | 1.07 | 5.5 | 1930 | 4.5 |
| Example 11 | 0.032 mol/L | AEPEEDA 0.03 mol/L | 1.07 | 5.5 | 1421 | 4.0 |
| Example 12 | 0.032 mol/L | PEDETA 0.03 mol/L | 1.07 | 5.5 | 1538 | 4.6 |

Polymer*: Poly(2-ethyl-2-oxazoline)
PEHA: Pentaethylenehexamine
TEPA: Tetraethylenepentamine
TETA: Triethylenetetramine
AEP: Aminoethylpiperazine
AETETA: 4-(2-aminoethyl)-N-(2-aminoethyl)-N'{2-{(2-aminoethyl)amino}ethyl}-1,2-ethandiamine)
AEPEEDA: (1-(2-aminoethyl)-4-[2-aminoethyl)amino]ethyl]-piperazine)
PEDETA: (1-[2-[[2-[(2-aminoethyl)amino]ethyl]amino]ethyl]-piperazine)

Referring to Table 1, it may be confirmed that the polishing slurry composition for the STI process including a polymer having an amide bond and a monomer that forms a cross-linking bond according to the present disclosure exhibits a high polishing speed and polishing selectivity for the oxide film and has an automatic polishing stop function for the polysilicon film.

According to the present disclosure, by applying a slurry additive solution including a polymer having an amide bond and a monomer forming a cross-linking bond, and abrasive particles dispersed with positive charges, a polishing slurry composition for an STI process that may have excellent polishing performance for a target film to be polished and an automatic polishing stop function due to a high polishing selectivity and that may prevent an occurrence of dishing, scratches, and the like, may be provided.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

The invention claimed is:

1. A polishing slurry composition for a shallow trench isolation (STI) process, the polishing slurry composition comprising:
    a polishing solution comprising abrasive particles; and
    an additive solution,
    wherein the abrasive particles are ceria prepared using a liquid-phase method, and surfaces of the abrasive particles have positive charges,
    wherein the additive solution comprises a polysilicon film polishing inhibitor comprising a polymer having an amide bond, and a monomer having three or more chains linked to one or more atoms,
    wherein the monomer forms a cross-linking bond with the polymer, and is included in the form of polymer cross-linking compounds,
    wherein the monomer is selected from the group consisting of tetraethylenepentamine (TEPA), pentaethylenehexamine (PEHA), hexaethyleneheptamine (HEHA), heptaethyleneoctamine (HEOA), triethylenetetramine, hydroxyethyltriethylenetetramine (HETETA), hydroxyethyltetraethylenepentamine (HETEPA), and tripropylenetetraamine,
wherein a molar ratio of the polymer:the monomer is 1:0.01 to 2,
wherein pH of the polishing slurry composition for the STI process ranges from 3 to 7, and
the polishing slurry composition for the STI process has a zeta potential of +5 millivolts (mV) to +70 mV.

2. The polishing slurry composition for the STI process of claim 1, wherein the polymer having the amide bond comprises at least one of compounds represented by the following Chemical Formula 1:

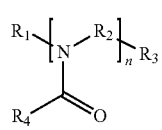

[Chemical Formula 1]

(in Chemical Formula 1, $R_1$, $R_3$ and $R_4$ are each selected from hydrogen, a hydroxy group, a $C_{1-30}$ alkyl group, a $C_{2-30}$ alkenyl group, a $C_{2-30}$ alkynyl group, a $C_{1-30}$ alkoxy group, a $C_{6-30}$ aryl group, a $C_{5-30}$ heteroaryl group (containing one or more heteroatoms selected from the group consisting of N, O and S), a $C_{4-30}$ heterocyclic group (containing one or more heteroatoms selected from the group consisting of N, O and S), a $C_{7-30}$ aralkyl group, an amine group, a —NH($R_4$)—$R_5$ (in which $R_4$ is $C_{1-30}$ alkylene or $C_{2-30}$ alkenylene, and $R_5$ is hydrogen or a hydroxy group), an oxyamine group, an azide group, and a thiol group,
$R_2$ is a simple bond and substituted or unsubstituted $C_{1-30}$ alkylene, $C_{2-30}$ alkenylene, $C_{7-30}$ cycloalkylene, $C_{6-30}$ arylene, $C_{7-30}$ arylalkylene, or $C_{2-30}$ alkynylene, and
n is an integer greater than or equal to "2").

3. The polishing slurry composition for the STI process of claim 1, wherein
the polymer comprises at least one selected from the group consisting of poly(2-methyl-2-oxazoline), poly(2-methyl-2-oxazoline) having a hydroxyl end, poly(2-methyl-2-oxazoline) having α-benzyl and ω-azide end, poly(2-methyl-2-oxazoline) having an azide end, poly(2-methyl-2-oxazoline) having a piperazine end, poly(2-ethyl-2-oxazoline), poly(2-ethyl-2-oxazoline) having an alkyne end, poly(2-ethyl-2-oxazoline) having α-benzyl and ω-thiol end, poly(2-ethyl-2-oxazoline) having α-methyl and ω-2-hydroxyethylamine end, poly(2-ethyl-2-oxazoline) having an amine end, poly(2-ethyl-2-oxazoline) having a piperazine end, poly(2-propyl-2-oxazoline), poly(2-propyl-2-oxazoline) having an azide end, and derivatives thereof.

4. The polishing slurry composition for the STI process of claim 1, wherein the polymer has a weight-average molecular weight of 1,000 to 5,000,000.

5. The polishing slurry composition for the STI process of claim 1, wherein the polymer is present in an amount of 0.001% by weight (wt %) to 1 wt % in the additive solution.

6. The polishing slurry composition for the STI process of claim 1, wherein
the abrasive particles comprise a primary particle with a size of 5 nanometers (nm) to 150 nm and a secondary particle with a size of 30 nm to 300 nm, and
the abrasive particles are present in an amount of 0.1 wt % to 10 wt % in the polishing slurry composition for the STI process.

7. The polishing slurry composition for the STI process of claim 1, further comprising:
water,
wherein a volume ratio of the polishing solution:the water:the additive solution is 1:3 to 10:1 to 10.

8. The polishing slurry composition for the STI process of claim 1, wherein
the additive solution further comprises an amphoteric compound, and
the amphoteric compound comprises at least one selected from the group consisting of lysine, methionine, cysteine, tyrosine, glycine, alanine, serine, phenylalanine, threonine, valine, leucine, isoleucine, proline, histidine, lysine, arginine, aspartic acid, tryptophan, glutamine, betaine, cocomidopropylbetaine, lauryl betaine, stearyl betaine, lauryl propyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium petine, 2-alkyl-N-carboxymethyl-N-hydroxyethylimidazolium betaine, lauryldimethylamine oxide, and lecithin.

9. The polishing slurry composition for the STI process of claim 8, wherein the amphoteric compound is included in an amount of 0.001 wt % to 2 wt % in the additive solution.

10. The polishing slurry composition for the STI process of claim 1, wherein the additive solution further comprises at least one acidic material selected from the group consisting of carboxylic acid, nitric acid, hydrochloric acid, phosphoric acid, sulfuric acid, hydrofluoric acid, bromic acid, iodic acid, pimelic acid, malic acid, malonic acid, maleic acid, acetic acid, adipic acid, oxalic acid, succinic acid, tartaric acid, citric acid, lactic acid, glutaric acid, glycolic acid, formic acid, fumaric acid, propionic acid, butyric acid, hydroxybutyric acid, aspartic acid, itaconic acid, tricarballylic acid, suberic acid, benzoic acid, phenylacetic acid, naphthoic acid, mandelic acid, picolinic acid, nicotinic acid, isonicotinic acid, quinolinic acid, anthranilic acid, fumaric acid, phthalic acid, isophthalic acid, terephthalic acid, pyridinecarboxylic acid, salicylic acid, glutamic acid, polyacrylic acid, a polyacrylic acid copolymer, polysulfonic acid, poly-α-methylstyrene sulfonic acid, poly-ρ-methylstyrene sulfonic acid, polystyrene sulfonic acid, polyvinyl sulfonic acid, a polysulfonic acid copolymer, a polysulfonic acid/acrylamide copolymer, and polyacrylamide methylpropane sulfonic acid.

11. The polishing slurry composition for the STI process of claim 1, wherein a polishing selectivity of an insulating film:a polysilicon film ranges from 10:1 to 1000:1.

* * * * *